United States Patent [19]

Wuchse

[11] 4,174,721
[45] Nov. 20, 1979

[54] APPARATUS FOR CLEANING MILKING SYSTEMS

[75] Inventor: Günther R. Wuchse, Vienna, Austria

[73] Assignee: Alfa-Laval AB, Tumba, Sweden

[21] Appl. No.: 798,941

[22] Filed: May 20, 1977

[30] Foreign Application Priority Data

May 21, 1976 [SE] Sweden .................. 7605772

[51] Int. Cl.² .................. B08B 3/02; B08B 9/08
[52] U.S. Cl. .................. 134/58 R; 134/168 R; 119/14.18
[58] Field of Search ............ 134/58 R, 168 R, 168 C, 134/169 R, 169 C; 119/14.18

[56] References Cited

U.S. PATENT DOCUMENTS

| | | | |
|---|---|---|---|
| 1,918,753 | 7/1933 | Jacobsen | 134/58 R |
| 2,730,992 | 1/1956 | Kessler | 134/169 C X |
| 3,122,149 | 2/1964 | Hauk et al. | 134/58 R |
| 3,236,248 | 2/1966 | Ray | 134/58 R |
| 3,310,061 | 3/1967 | Bender | 134/58 R |
| 3,665,941 | 5/1972 | Griparis | 134/58 R |

Primary Examiner—Robert L. Bleutge
Attorney, Agent, or Firm—Cyrus S. Hapgood

[57] ABSTRACT

Teat cups are connected through a milk transport conduit to a receptacle communicating with a vacuum source, and a storage tank having a drain outlet is adapted to receive milk from the receptacle by way of a pump. A unit for controlling a cleaning procedure is connectable to the receptacle through the milk conduit. The pump can be connected selectively to either the control unit or a sprayer for cleaning liquid which opens into the storage tank; and the drain outlet of the tank can be connected selectively to either the receptacle or a discharge line.

5 Claims, 1 Drawing Figure

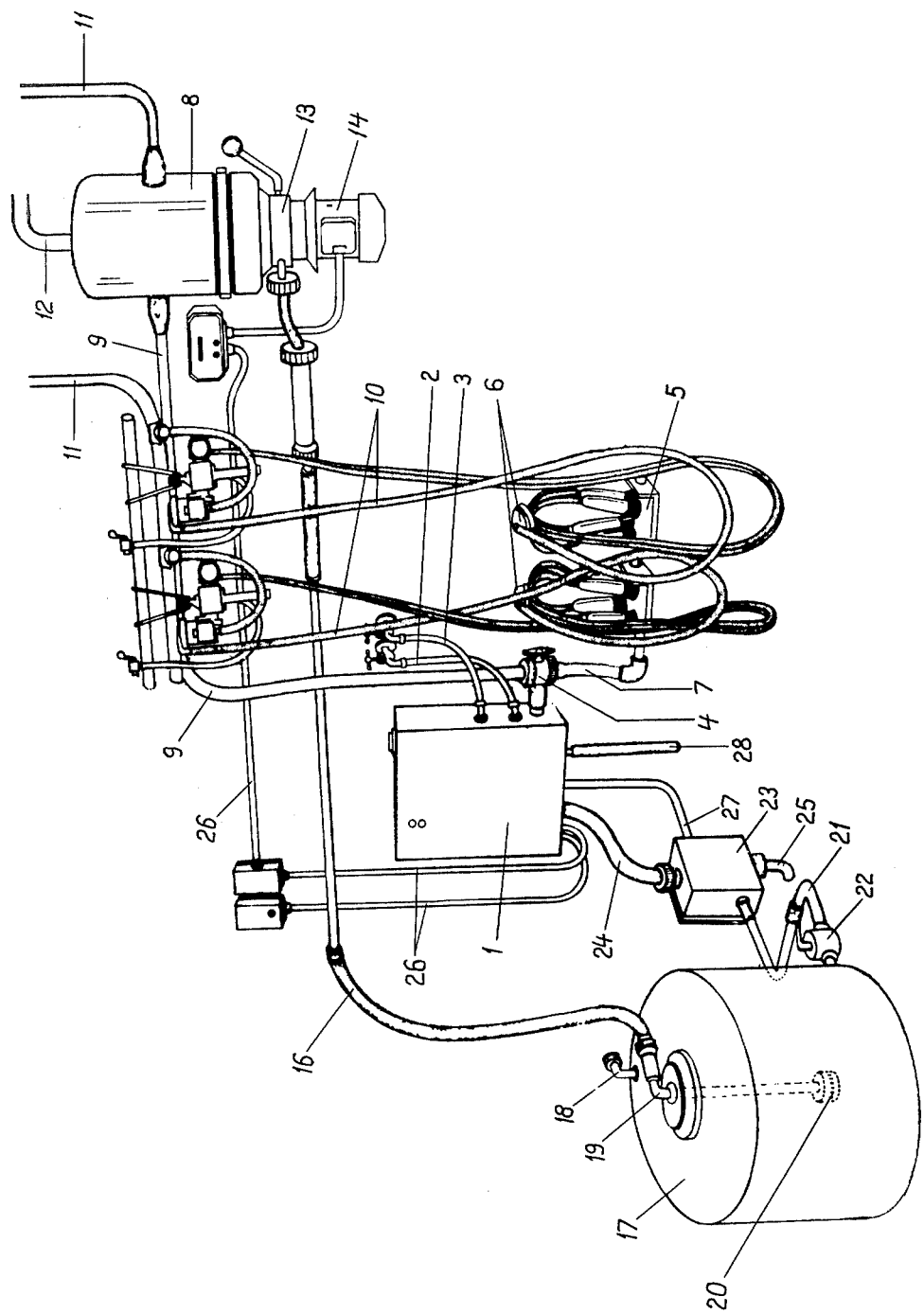

APPARATUS FOR CLEANING MILKING SYSTEMS

The present invention relates to an apparatus for cleaning a milking system comprising at least one milking means connected via a milk transport conduit to a receptacle which is connected to a vacuum source and provided with a pump, a storage tank provided with at least one sprayer for cleaning liquid and at least one drain outlet, and a control unit provided with programming means for controlling the cleaning procedure.

Known apparatus for automatically cleaning a milking system having a storage tank for storing the milk, until delivered to the dairy, generally comprise a receptacle for cleaning liquid, one or more pumps for circulating the cleaning liquid through the system, and control equipment for controlling the operation of the pumps and the rest of the cleaning procedure. Such apparatus are technically relatively complicated and are consequently expensive to produce and maintain. It is also common to use separate cleaning systems for cleaning the milking equipment and the storage tank, respectively.

According to the present invention, a less complicated and less expensive apparatus is provided which makes it possible to clean the milking equipment as well as the storage tank automatically. The apparatus is relatively simple and thus less costly, but nevertheless it makes it possible to clean a complete milking plant with its storage tank and is therefore economically attractive even for smaller milking systems. The apparatus according to the invention is generally characterized in that the control unit is connectable to the receptacle via the milk transport conduit and that the pump is optionally connectable to the control unit or to the sprayer for cleaning liquid, the drain outlet of the storage tank being optionally connectable either to the receptacle or to an outlet.

The invention will be described in more detail below with reference to the accompanying drawing, in which the single illustration is a schematic view of a preferred embodiment of the new cleaning apparatus.

The cleaning apparatus as illustrated comprises a control unit 1 which contains a programmer with necessary time relays and valves for controlling the cleaning procedure and is supplied with hot and cold water via conduits 2 and 3, respectively. By way of a three-way valve 4, the control unit 1 is connected on the one hand to a connection gear 5 for milking means 6 by means of a conduit 7, and on the other hand to a milk receptacle 8 by means of a conduit 9. The milking means 6, comprising clusters of teat cups, are connected by means of hoses 10 to a milk transport conduit 11 which is connected via milking positions (not shown) to the receptacle 8. The latter is connected at its upper end to a vacuum source 12 and is provided at its lower end with a pump 13 which is driven by a motor 14.

The pump 13 is connected by means of a conduit 16 to a milk storage tank 17. The tank 17 is provided with a milk inlet 18 and a cleaning liquid inlet tube 19 with a sprayer 20. The tank also has a drain outlet which is connected by means of a conduit 21, provided with a shut-off cock 22, to a three-way valve 23 which is controlled by the control unit 1. The outlet of tank 17 can be connected through valve 23 either to the control unit 1 by means of a conduit 24 or to an outlet 25. The control unit 1 is connected by means of electric conduits 26 and 27 to the motor 14, a vacuum pump (not shown) and to the valve 23, and is further provided with an outlet tube 28.

During milking, the milk flows from the milking means 6 through hoses 10 and milk transport conduit 11 to the receptacle 8 which is under vacuum, and is pumped by the pump 13 against the action of the vacuum to the storage tank 17 through the conduit 16, which is now connected to the milk inlet 18. The cock 22 is, of course, kept closed during milking.

When the milking equipment is to be cleaned after milking, the milking means 6 are connected to the connection gear 5 and to the milk transport conduit 11, as shown in the illustration. The conduit 24 is removed from the control unit 1, and the conduit 16 is removed from the milk inlet 18 and connected to control unit 1 in place of conduit 24. The valve 4 is adjusted manually to its correct position, whereupon the cleaning program is started. The control unit 1 with its programmer provides for filling the system with cleaning liquid of the correct amount and temperature. The cleaning liquid is sucked by means of vacuum via conduit 7, the connection gear 5, the milking means 6, the hoses 10 and the milk transport conduit 11 to the receptacle 8, and the liquid is pumped therefrom by the pump 13 back to the control unit 1 through the conduit 16. The pump motor 14 is controlled, as during the milking operation, by means of a level sensor (not shown) disposed in the receptacle 8.

When the cleaning liquid has circulated in this manner for a fixed time according to the program, the outlet 28 is opened for draining the cleaning liquid, the pump 13 being operated for a predetermined time independently of said level sensor, whereby all liquid is drained. Fresh cleaning liquid is then refilled and the described procedure is repeated until the cleaning program has been completed.

When the storage tank 17 is to be cleaned, the conduit 24 is connected to the control unit 1 and the conduit 16 is connected to the sprayer 20, as shown in the drawing. The cock 22 is opened and the three-way valve 4 is adjusted, whereupon the cleaning program is started. The cleaning liquid supplied by the control unit 1 is sucked through the conduit 9 to the receptacle 8 under the influence of the vacuum in the latter. The liquid is pumped from the receptacle 8 through the conduit 16 to the sprayer 20 whereby the interior of the tank 17 is flushed. When the proper amount of liquid of the proper temperature has been filled into the system, the liquid is sucked via the outlet of tank 17 through the conduits 21, 24 and 9, via valve 23 and control unit 1, to the receptacle 8. The cleaning liquid is thus conveyed from the tank 17 back to the receptacle 8 by means of the vacuum in the latter. In order to make this possible, it is required that the pipe connection between the tank 17 and the receptacle 8 via the control unit 1 form a closed conduit with no air admission.

When the cleaning liquid has circulated for the time determined by the programming means, the valve 23 is adjusted to connect the outlet of the tank 17 to the outlet or discharge means 25. At the same time, the outlet 28 of the control unit is opened, and the pump 13 is started, whereby cleaning liquid remaining in the receptacle 8 is pumped over to the tank 17. The outlet 25 is disposed so that liquid remaining in the tank 17 is drained by gravity.

As mentioned above in connection with the cleaning of the milking system, the cleaning procedure is then repeated with fresh cleaning liquid until the entire cleaning program has been completed.

I claim:

1. In a milking system, the combination of a milking means, a receptacle, a milk transport conduit connecting said milking means to the receptacle, a vacuum source communicating with the receptacle, a pump connected to the receptacle, a storage tank adapted to receive milk from the receptacle by way of said pump, said tank having a drain outlet, a sprayer for cleaning liquid opening into said tank, a control unit having a programmer for controlling a cleaning procedure, the control unit being connectable to said receptacle through said milk transport conduit, first duct means for connecting the pump selectively to either the control unit or said sprayer, discharge means, and second duct means for connecting said drain outlet selectively to either said receptacle or said discharge means.

2. The combination of claim 1, in which said second duct means include a pipe system for conveying cleaning liquid to said receptacle by the vacuum in the receptacle.

3. The combination of claim 1, including a pipe system for conveying cleaning liquid from the control unit to said receptacle by the vacuum in the receptacle.

4. The combination of claim 3, in which the control unit is connectable to the receptacle through the milking means as well as said milk transport conduit.

5. The combination of claim 1, in which the control unit has an outlet adapted to be opened simultaneously with opening of said drain outlet of the storage tank, in order to drain cleaning liquid remaining after a cleaning operation.

* * * * *